Figure 1:
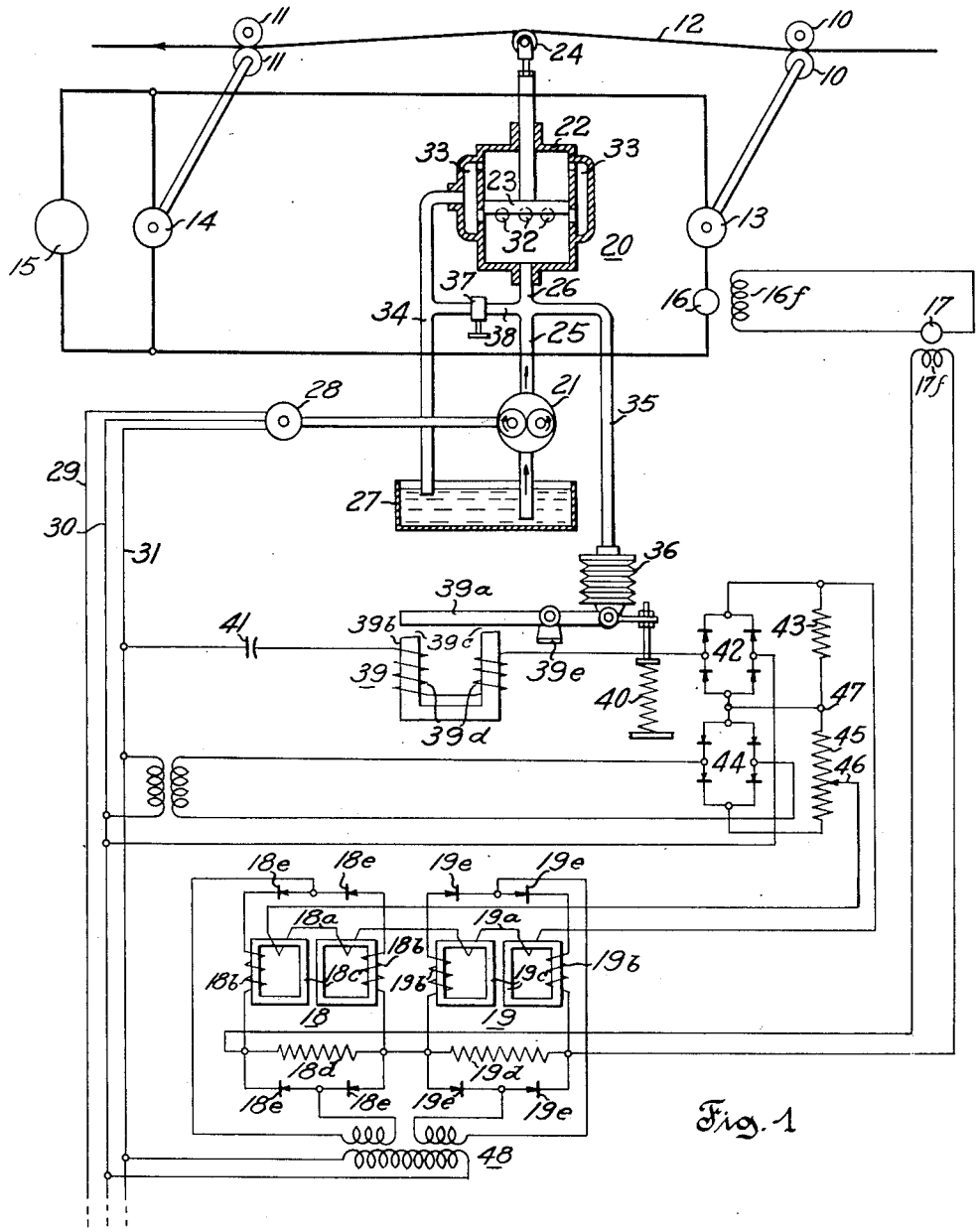

April 12, 1955

J. A. WOLFE 2,706,267

TENSION CONTROL SYSTEM UTILIZING A REASONABLE CIRCUIT

Filed Oct. 26, 1953

Inventor
John A. Wolfe
by Howard M. Herriot
Attorney

United States Patent Office 2,706,267
Patented Apr. 12, 1955

2,706,267

TENSION CONTROL SYSTEM UTILIZING A RESONABLE CIRCUIT

John A. Wolfe, St. Paul, Minn., assignor to Allis-Chalmers Manufacturing Company, Milwaukee, Wis.

Application October 26, 1953, Serial No. 388,383

5 Claims. (Cl. 318—6)

This invention relates to control systems for apparatus operating on a strip of material and more particularly to systems for controlling the tension of the strip.

More specifically, the invention relates to such systems in which an inductive device having an air gap variable in response to variations in the tension is utilized to maintain the tension constant.

Systems of this type are known in which a variable air gap differential transformer responds to tension variations to vary the current supplied to a relay coil. In such systems the circuit including the transformer has primarily an inductive reactance and has substantially no capacitive reactance. A disadvantage of such systems is that the variations of the output of the inductive device are not linearly related to the variations of the air gap and the output is not proportional to the tension. Another disadvantage of such systems is that the output of the circuit is at its minimum value at some value of tension other than zero and will increase with either increases or decreases of tension from that value.

It has been discovered that these disadvantages are overcome by providing in the system a resonable circuit having a capacitor and a variable air gap reactor responsive to tension variations for varying the proximity of the resonable circuit from its resonant condition to cause the output of the circuit to be linearly related with the width of the air gap and the tension, and to be at its minimum value when the tension is at zero, and to increase with only increases in tension.

It is therefore an object of this invention to provide regulating means in which the output is linearly related with the width of an air gap for producing a signal voltage output proportional to the tension.

It is a further object of this invention to provide regulating means in which the output is at its minimum value when the tension is zero and will increase with only increases in tension.

Another object of this invention is to provide regulating means for producing a reversible polarity control current proportional to variations of a tension from a predetermined value.

An additional object of this invention is to provide regulating means for producing large changes in a signal voltage and a control current in response to small changes in tension.

Objects and advantages other than those above set forth will be apparent from the following description when read in conjunction with the drawing.

Figure 2:
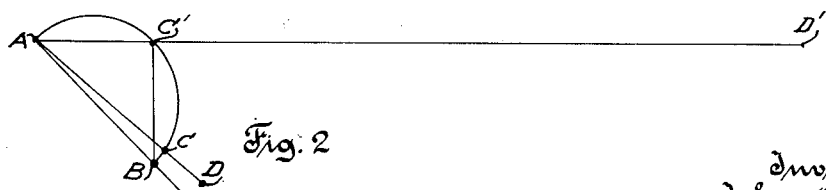

Fig. 1 diagrammatically illustrates one embodiment of the invention and Fig. 2 is a vector diagram illustrating the operation of the invention.

Fig. 1 of the drawing shows the invention embodied in a tension control system for a rolling mill. Rolls 10 and 11 of the first and second stands of the mill are adapted to move a strip 12 in the arrow direction of the mill.

The rolls 10 and 11 are driven by motors 13 and 14 respectively for simultaneously working the strip 12. A generator 15 supplies current to the motors 13, 14. A booster generator 16 is connected between the generator 15 and the motor 13 of the first stand of the mill. The booster generator 16 is provided with a field winding 16f the excitation of which determines the boosting or bucking effect of the booster generator 16 and is supplied by an exciter generator 17. The exciter generator 17 is in turn provided with a field winding 17f the excitation of which is supplied by magnetic amplifiers 18, 19.

A hydraulically operated tensiometer 20 cooperates with a pump 21 to provide a supply of fluid pressure depending on the tension of the strip 12. This tensiometer is claimed and fully described in U. S. Patent 2,348,695, granted to Harold Reichert.

Briefly, tensiometer 20 comprises a cylinder 22 in which a piston 23 is supported by fluid pressure for holding a roll 24 against the strip 12. The pump 21 of the constant delivery type supplies cylinder 22 with a suitable fluid under pressure, such as oil, through pipes 25, 26 from reservoir 27. The pump 21 is driven by a constant speed motor 28 which is supplied with current from alternating current supply lines 29, 30 and 31. Discharge openings 32 are provided between cylinder 22 and reservoir 33 communicating with reservoir 27 through pipe 34. A very slight movement of the piston 23 opens or restricts the openings 32 so that the pressure of the oil beneath the piston 23 is always equal to the pressure of the strip 12 on the roll 24 plus the dead weight of the roll and piston assembly. The tensiometer thus cooperates with the pump 21 to provide through a pipe 35 to an expansible bellows 36 a supply of fluid under a pressure depending on the tension of the strip 12. The fluid pressure in the cylinder 22, the pipe 35, and the bellows 36 is an accurate measure of the tension of the strip 12. A valve 37 may be provided in a pipe 38 joining pipes 26 and 34 for controlling the drainage of oil from the cylinder 22 when the system is to be shut down.

A variable air gap reactor 39 has its armature 39a pivoted on member 39e so as to be movable relative to its core member 39b. The bellows 36 is operatively connected to the armature 39a to cause the pressure of the fluid in pipe 35 to work against the force of an adjustable spring 40 and the pull of the reactor to move the armature 39a. The air gap 39c thus varies in response to variations of the tension of the strip. The pull of the reactor on armature 39a is substantially constant because the voltage across the windings 39d of the reactor increases as the air gap increases. This minimizes the effect of the reactor's pull affecting the position of the armature 39a. A reactor is selected having a pull small in comparison with the force of the bellows 36 so that the position of the armature 39a and thus the air gap 39c is determined mainly by the oil pressure on the bellows 36 and is substantially independent of the pull of the reactor 39.

Windings 39d of the reactor 39 are connected in a resonable circuit with a capacitor 41 and a load device comprising a full wave rectifier 42 and a resistor 43. The term "resonable circuit" as used herein means a circuit having both capacitive and inductive reactance with one of the reactances being variable for varying the proximity of the circuit from its resonant condition. The reactor 39 and the capacitor 41 may be connected in a series resonable circuit as shown in the drawing or may be connected in a parallel resonable circuit. The alternating current terminals of rectifier 42 are connected in a series resonable circuit with the windings 39d and the capacitor 41. The resistor 43 is connected across the direct current terminals of the rectifier 42 so that a unidirectional signal voltage will appear across resistor 43. A source of alternating current represented as supply lines 30, 31, energizes the resonable circuit. Another full wave rectifier 44 has its alternating current terminals connected to the same source of alternating current at supply lines 30, 31. A resistor 45 is connected across the direct current terminals of rectifier 44 to provide between adjusting means 46 and terminal 47 a unidirectional reference voltage corresponding to a predetermined value of tension in the strip 12. Inasmuch as the reference voltage appearing across part of resistor 45 is obtained from the same source as is the signal voltage appearing across resistor 43, the effect of a change in the line voltage of supply lines 30, 31 is minimized. Rectifiers 42 and 44 are so connected that the signal voltage appearing across resistor 43 and the reference voltage appearing between terminal 47 and adjusting means 46 on resistor 45 are opposed and a difference between these voltages will cause a unidirectional control current to flow in control windings 18a, 19a to control the magnetic amplifiers 18, 19. The unidirectional control current is reversible, depending upon which of these voltages is the largest.

Fig. 2 shows the relation between the voltage vectors of the resonable circuit heretofore described. AB represents the voltage applied to the circuit from the voltage source at alternating current supply lines 30, 31. Voltage AB is constant and always equal to the vector sum of the voltage across reactor 39, the voltage across capacitor 41, and the voltage across the alternating current terminals of rectifier 42. When the air gap of reactor 39 is at some value corresponding to some value of tension, then: AD represents the voltage across the reactor 39; DC represents the voltage across capacitor 41; and CB represents the voltage impressed on the alternating current terminals of rectifier 42. When the air gap of reactor 39 is at some slightly higher value corresponding to a higher value of tension, then: AD' represents the voltage across reactor 39; D'C' represents the voltage across capacitor 41; and C'B represents the voltage impressed on the alternating current terminals of rectifier 42. It will be noted that the voltage across the alternating current terminals of rectifier 42 will always appear as a chord of the semicircle AC'CB and that at the resonant condition of the resonable circuit this voltage will appear as AB. The voltage across the alternating current terminals of rectifier 42 is of course a direct measure of the signal voltage impressed on resistor 43 by rectifier 42. By comparing the lengths of CB and C'B it can thus be seen that a small change in the width of the air gap produces a large change in the value of the signal voltage.

Referring again to Fig. 1, the magnetic amplifiers 18, 19 comprise control windings 18a, 19a, reactance windings 18b, 19b, cores 18c, 19c, load resistors 18d, 19d, and rectifiers 18e, 19e, in full wave rectification arrangement. Reactance windings 18b, 19b are supplied through transformer 48 with current from supply lines 30, 31 and are connected in a "push-pull" or "back to back" arrangement to provide a reversible unidirectional current output to the field winding 17f of the exciter generator 17 in response to the reversible unidirectional control current supplied to control windings 18a, 19a.

The variations of the air gap 39c of reactor 39 in response to variations of the tension of the strip 12 are utilized to maintain the tension substantially constant by regulating the torque of motor 13 driving the rolls 10 of the first stand of the rolling mill. The variations of the air gap cause variations of the reactance of reactor 39. The capacitor 41 and the reactor 39 coact to bring their resonable circuit either closer to or further from its resonant condition for producing a signal voltage to accomplish the regulation. The operation of the system is as follows:

The adjusting means 46 may be moved on resistor 45 to select a predetermined value of tension at which it is desired to operate the strip 12. When the tension of the strip is at the predetermined value, the signal voltage across resistor 43 is equal and opposite to the reference voltage in that part of resistor 45 between terminal 47 and adjusting means 46, and thus no current will flow in the control windings 18a, 19a of magnetic amplifiers 18, 19. If the strip tension exceeds the predetermined value, the pressure of the fluid in the cylinder 22 and the pipe 35 increases and this pressure increase is transmitted to the bellows 36. The pressure on the bellows acts against the spring 40 to increase the air gap 39c. Assuming the reactance of windings 39d to be greater than the reactance of capacitor 41, the decrease in the reactance of the windings 39d thus caused will tend to bring the resonable circuit into closer proximity to its resonant condition. The coaction of the capacitor 41 and the reactor 39 thus greatly increases the voltage across the alternating current terminals of rectifier 42 and does so in a substantially linear relationship with the increase of the air gap 39c of reactor 39. A very slight change in the air gap 39c will produce a large change in this voltage so that for slight variations in the tension of the strip 12 large variations in this voltage will be produced. This voltage is rectified and appears across resistor 43 as a unidirectional signal voltage substantially proportional to the air gap 39c, to the pressure on the bellows 36, and to the tension of the strip 12. This signal voltage across resistor 43 is now greater than the reference voltage of resistor 45, and being opposite thereto, causes a control current to flow in control windings 18a, 19a. This control current is proportional to the increase in tension above the predetermined value and is in a direction to saturate the cores of one of the magnetic amplifiers and to desaturate the cores of the other magnetic amplifier, and thus unbalances the opposed voltages across load resistors 18d, 19d. This action causes a current to flow in field winding 17f of exciter generator 17 in such a direction as to cause exciter generator 17 to excite booster generator field winding 16f in the direction to cause booster generator 16 to aid generator 15. The speed of motor 13 thus increases and the tension of the strip is reduced to return the tension to its predetermined value.

If the strip tension decreases below the predetermined value, the operation is the reverse of that described above and capacitor 41 and reactor 39 coact to take their resonable circuit further away from its resonant condition to thus decrease the signal voltage across resistor 43. The signal voltage now becomes smaller than the reference voltage of resistor 45 and the control current in control windings 18a, 19a will be in the opposite direction than for the previously described operation. The magnetic amplifiers 18, 19, thus supply a current to field winding 17f in a direction to cause exciter generator 17 to excite booster generator 16 in the direction to cause the booster generator to buck generator 15. The speed of motor 13 is thus decreased and the tension is thereby increased to return the strip to the predetermined value of tension. The tension of the strip 12 is thus maintained substantially constant at the desired predetermined value.

The unidirectional reversible control current produced in control windings 18a, 19a, is always substantially proportional to the magnitude and direction of the variation of the strip tension from a predetermined value. The corrective effect obtained is therefore always proportional to the corrective effect needed to maintain the tension constant at the desired value. A small variation in tension results in a large variation in the control current to produce the corrective effect.

Although only one embodiment of the invention has been illustrated and described, it will be apparent to those skilled in the art that various changes and modifications may be made therein without departing from the spirit of the invention or from the scope of the appended claims.

It is claimed and desired to secure by Letters Patent:

1. In a system for controlling the tension in a strip of material, a dynamoelectric machine and means operatively connected therewith for producing a tension in said strip, a series circuit having a variable air gap reactor, a capacitor and a first load device, a source of alternating current, means connecting said circuit to said source, means responsive to said tension for varying the air gap of said reactor to vary the proximity of said circuit from its series resonant condition for producing in said first load device a signal voltage substantially proportional to said tension, a second load device, means connecting said second load device to said source for producing in said second load device a reference voltage, means differentially responsive to said voltages for producing a control current substantially proportional to variations of said tension from a predetermined value, and means responsive to said control current for controlling said dynamoelectric machine to maintain said tension substantially constant.

2. In a system for controlling the tension in a strip of material, a dynamoelectric machine and means operatively connected therewith for producing a tension in said strip, a series circuit having a variable air gap reactor and a capacitor, a source of alternating current, means connecting said circuit to said source, means responsive to said tension for varying the air gap of said reactor to vary the proximity of said circuit from its series resonant condition for producing a signal voltage substantially proportional to said tension, means for producing a reference voltage, and means differentially responsive to said voltages for controlling said dynamoelectric machine to maintain said tension substantially constant.

3. In a system for controlling the tension in a strip of material, a dynamoelectric machine and means operatively connected therewith for producing a tension in said strip, a circuit having a variable air gap reactor, a capacitor and a first load device, a source of alternating current, means connecting said circuit to said source, means responsive to said tension for varying the air gap of said reactor to vary the proximity of said circuit from its resonant condition for producing in said first load device a signal voltage substantially proportional to said tension, a second load device, means connecting said second load device to said source for producing in said second load device a reference voltage, means differentially responsive to said voltages for producing a control current substantially proportional to variations of said tension from a predetermined value, and means responsive to said control current for controlling said dynamoelectric machine to maintain said tension substantially constant.

4. In a system for controlling the tension in a strip of material, a dynamoelectric machine and means operatively connected therewith for producing a tension in said strip, a circuit having a variable air gap reactor and a capacitor, a source of alternating current, means connecting said circuit to said source, means responsive to said tension for varying the air gap of said reactor to vary the proximity of said circuit from its resonant condition for producing a signal voltage substantially proportional to said tension, means for producing a reference voltage, and means differentially responsive to said voltage for controlling said dynamoelectric machine to maintain said tension substantially constant.

5. In a system for controlling the tension in a strip of material, a dynamoelectric machine and means operatively connected therewith for producing a tension in said strip, means including a capacitor and a reactor having an air gap variable in response to variations of said tension for producing a control current substantially proportional to variations of said tension from a predetermined value, and means responsive to said control current for controlling said dynamoelectric machine to maintain said tension substantially constant.

References Cited in the file of this patent

UNITED STATES PATENTS

| | | |
|---|---|---|
| 2,070,743 | McDonnell | Feb. 16, 1937 |
| 2,361,173 | Browne | Oct. 24, 1944 |
| 2,372,056 | Broding | Mar. 20, 1945 |
| 2,452,156 | Schover | Oct. 26, 1948 |
| 2,605,101 | Lessman | July 29, 1952 |